(12) United States Patent
Abel et al.

(10) Patent No.: US 8,681,819 B2
(45) Date of Patent: Mar. 25, 2014

(54) PROGRAMMABLE MULTIFIELD PARSER PACKET

(75) Inventors: Francois Abel, Rueschlikon (FR); Jean Calvignac, Raleigh, NC (US); Christoph Hagleitner, Wallisellen (CH); Jan van Lunteren, Rueschlikon (CH); Fabrice Verplanken, LaGaude (FR)

(73) Assignee: International Business Machines Corporation, Armonk, NY (US)

( * ) Notice: Subject to any disclaimer, the term of this patent is extended or adjusted under 35 U.S.C. 154(b) by 526 days.

(21) Appl. No.: 13/017,963

(22) Filed: Jan. 31, 2011

(65) Prior Publication Data

US 2012/0195208 A1    Aug. 2, 2012

(51) Int. Cl.
*G01R 31/08*        (2006.01)
*H04J 3/24*         (2006.01)

(52) U.S. Cl.
USPC .......................................... 370/474; 370/252

(58) Field of Classification Search
None
See application file for complete search history.

(56) References Cited

U.S. PATENT DOCUMENTS

| | | | |
|---|---|---|---|
| 6,611,524 B2 | 8/2003 | Devanagondi et al. | |
| 6,816,490 B1 * | 11/2004 | Chung | 370/392 |
| 6,965,646 B1 * | 11/2005 | Firestone | 375/240.26 |
| 7,187,694 B1 | 3/2007 | Liao | |
| 7,233,597 B2 | 6/2007 | Kumar et al. | |
| 7,274,698 B2 | 9/2007 | Shankar et al. | |
| 7,508,985 B2 | 3/2009 | Van Lunteren | |
| 7,580,408 B2 | 8/2009 | Kendall | |
| 2003/0039247 A1 | 2/2003 | Henriksson et al. | |
| 2005/0141534 A1 | 6/2005 | Kawabata et al. | |
| 2007/0282573 A1 * | 12/2007 | Fritz et al. | 703/2 |
| 2008/0228798 A1 | 9/2008 | Van Lunteren | |
| 2010/0191865 A1 * | 7/2010 | Wang et al. | 709/250 |
| 2011/0320653 A1 | 12/2011 | Lais et al. | |

OTHER PUBLICATIONS

Ether Types, [online]; [retrieved on Jan. 31, 2011]; retrieved from the Internet http://www.iana.org/assignments/ethernet-numbers.
Processor Acceleration Through Automated Instruction Set Customization, [online]; [retrieved on Jan. 31, 2011]; retrieved from the Internetn http://www.microarch.org/micro36/html/./pdf/clark-ProcessorAcceleration.pdf.
Protocol Numbers, [online]; [retrieved on Jan. 31, 2011]; retrieved from the Internet http://www.iana.org/assignments/protocol-numbers/protocol-numbers.xml.

* cited by examiner

*Primary Examiner* — Jutai Kao
(74) *Attorney, Agent, or Firm* — Cantor Colburn LLP; Daniel Morris (57) ABSTRACT

A method of operating a packet parser in a computing system includes providing a configurable packet pointer by the packet parser, the packet pointer configured to index a configurable number of atomic parsing elements, the atomic parsing elements having a configurable size, in a data stream received by the computing system for extraction, wherein the indexed atomic parsing elements are non-contiguous in the data stream; and receiving the extracted indexed atomic parsing elements from the data stream by the packet parser.

18 Claims, 8 Drawing Sheets

| RULE REGISTERS 401 | STATE REGISTER 402 | RANGE COMPARISON RESULT 403 | EXTRACTED BYTES 404 | PACKET POINTER 405 |
|---|---|---|---|---|

FSM WORK REGISTER 400

PROGRAMMABLE MULTIFIELD PARSER PACKET

BACKGROUND

This disclosure relates generally to the field of packet processing systems, and more specifically to a programmable multifield packet parser to perform data extraction and inspection of received packets.

Data transferred over a communication channel may be provided in a streaming mode, which is a serial sequence of information. An advantage of streaming data is that the receiver may start processing the content of the data stream before the entire stream is received. Streaming data may include various types of content, such as video, audio, or multimedia content. Streaming enables the data to be played back as soon as it is received, thus reducing the delay at the receiver before the media can be presented to the user.

Streaming data is supported by underlying networks and protocols that are used to transport the data stream. Every datagram, cell, packet, and frame transferred over a network is formatted as a stream of bits. Sequential ordering of information is inherent to protocols used to transfer streaming data over a network, as sequential ordering of streamed information reduces the amount of processing required at the receiver. The beginning of a stream may contain one or multiple fields of information regarding the rest of the stream. For example, the first digit of an internet protocol (IP) datagram may indicate the IP version of the stream.

Sequential ordering enables flexible protocol stack combinations, which allow different sets of computers running different high-level network protocols to share the same physical media. For example, the stacking of transmission control protocol (TCP) over IP protocol may be indicated by the protocol field of the IP header datagram, which is transferred ahead of the payload part of the IP datagram used to embed the TCP datagram. TCP over IP is also referred to as protocol encapsulation because it turns a given network layer into a trucking service that is unaware of the data it carries for the upper layer applications, enabling protocols to be deployed with flexible options. For example, the next header field of an IPv6 datagram may encode a higher layer protocol such as TCP or user datagram protocol (UDP), or may indicate that the next datagram is one of the IPv6 extension headers and that it is carrying some additional options related to the current IP protocol layer.

The receiver may need to extract one or more particular fields, such as header information, from a stream of data as it is received in order to properly process the rest of the data stream according to the correct protocol. This may be achieved by reading the streaming data into a temporary physical buffer, and advancing a stream pointer through the buffer to extract the needed data from its position in the stream. However, advancing a stream pointer through a buffer may be a relatively slow process. Also, because of protocol stacking and protocol encapsulation, the exact numbers of bytes that make up a header stack may not be known before the stream parsing is done. Therefore, an arbitrary number of bytes must be allocated to the header buffer in order to account for both short packets (e.g. a 42 bytes DIX/IPv4/UDP) as well as long packets (e.g. a 206 bytes DIX/IPv6+Destination+Routing+Fragment-extension-headers/TCP). Although main memory may be cheap and abundant in today's computers, it is a scarce resource for a system on a chip (SoC) and similar VLSI devices, in which multiple functions share a limited amount of area and power on the silicon. Because of memory constraints, hardware packet parsers and protocol processors may only process a limited amount of an incoming stream by dedicating a finite number of buffers to the stream data. In general, only the first few tens or hundreds first bytes can be processed, which may corresponds to the minimum size required to hold the protocol stack headers of a frame of some formats of streaming data. However, other formats, such as InfiniBand (IB) or Ethernet, operate with maximum transfer unit (MTU) sizes of multiple kilobytes.

Variable length fields need to be inspected and processed in order to handle various protocols by a packet processing system. For example, an IPv6 header is composed of field sizes that span from 4 bits (e.g., the IP version) up to 128 bits (e.g., the IP source and destination addresses). Although large fields used to be segmented into smaller fields of fixed size, the solution is not practical at multi-gigabit/s data rates because of the dependency between the data rate and the stream processing frequency (processing_frequency=data_rate/field size). The smaller the field size, the higher the processing frequency needs to be. Therefore, processing a 10 Gb/s Ethernet stream on the basis of fixed field sizes of 8 bits has to be performed at a frequency of 1.25 GHz, which is relatively hard to achieve given the number of fields that must be evaluated and processed in every clock cycle. One solution for relaxing the processing frequency is widening the size of the fixed field from 8 to 16, 32 or 64 bits, and to provide some filtering mask mechanism for extracting shorter fields such as the Ethernet type/len (16 bits) or the IP protocol (8 bits). For example, the IP version (4 bits) can be extracted from a fixed field of 16 bits by isolating the appropriate digit with a mask such as 0xF000, 0x0F00, 0x00F0 or 0x000F. However, since most of the network and media protocols are digit- and/or byte-based, the management and the generation of such masks is a relatively complex process.

Packet payload inspection may also need to be performed, in addition to extraction and inspection of information from the packet header. Because payload information is content-dependent, the location and size of the payload information may not be known in advance. As a result, payload inspection is relatively complex to perform as compared to header parsing, as the payload information to be inspected must be searched within the packet.

A stream processing application may be difficult to accelerate by means of parallelization techniques because of intrinsic sequential data representation. For the case of network protocol processing, this means that the beginning of a network frame typically contains one or multiple fields indicating what the rest of the frame is about. For example, the processing of the 5th and 6th bytes of an IP datagram cannot start before the IP version has been identified by processing the first digit of the datagram: bytes 5-6 of IPv4 encode the "IPv4 Fragment Identification", while bytes 5-6 of IPv6 encode the "IPv6 Payload Length".

BRIEF SUMMARY

In one aspect, a method of operating a packet parser in a computing system includes providing a configurable packet pointer by the packet parser, the packet pointer configured to index a configurable number of atomic parsing elements, the atomic parsing elements having a configurable size, in a data stream received by the computing system for extraction, wherein the indexed atomic parsing elements are non-contiguous in the data stream; and receiving the extracted indexed atomic parsing elements from the data stream by the packet parser.

In one aspect, a packet parser for a computing system is configured to provide a configurable packet pointer, the packet pointer configured to index a configurable number of atomic parsing elements, the atomic parsing elements having a configurable size, in a data stream received by the computing system for extraction, wherein the indexed atomic parsing elements are non-contiguous in the data stream, the packet parser further configured to receive the extracted indexed atomic parsing elements from the data stream.

Additional features are realized through the techniques of the present exemplary embodiment. Other embodiments are described in detail herein and are considered a part of what is claimed. For a better understanding of the features of the exemplary embodiment, refer to the description and to the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

Embodiments of a programmable multifield packet parser, and methods of operating a programmable multifield packet parser, are provided, with exemplary embodiments being discussed below in detail. A programmable multifield packet parser may parse both the header and the payload of incoming packets on the fly (i.e., at wire-speed) by providing a configurable packet pointer that may extract a configurable size and number of atomic parsing elements at a time from received packets. Management of the configurable packet pointer may be performed by a programmable finite state machine (FSM), which may be adapted to many different applications and protocols.

Figure 1:
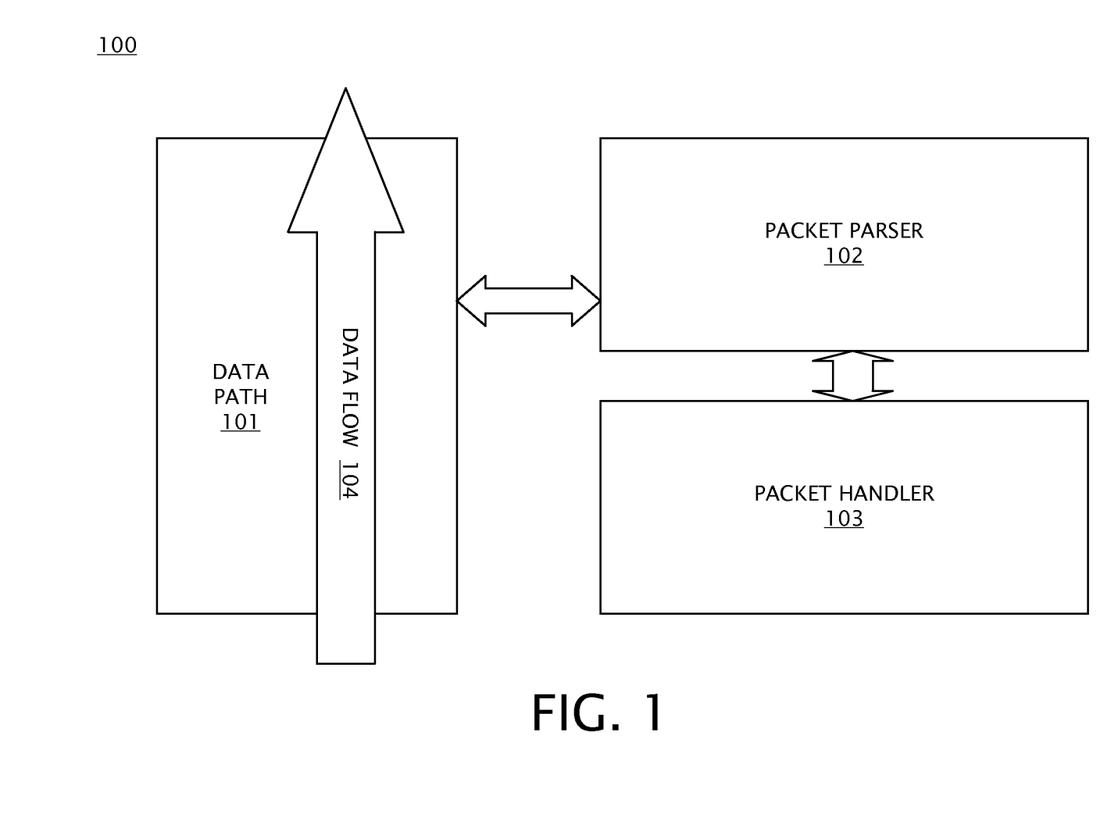
FIG. 1 is a schematic block diagram illustrating an embodiment of a packet processing system including a programmable multifield packet parser.

FIG. 1 illustrates an embodiment of a packet processing system 100 with a programmable multifield packet parser 102. Packet processing system 100 includes a data path (DP) 101 that exposes the content of a data flow 104 to a packet parser 102, and a packet handler (PH) 103 that performs specific data processing operations for the packet parser 102. Data flow 104 may include any flow of data received by a computing system in which the packet processing system 100 is embodied, and may be formatted according to any appropriate protocol. As data flow 104 progresses through the DP 101, the DP 101 receives requests for data in data flow 104 from packet parser 102. The DP 101 extracts the requested data from data flow 104, and passes the extracted data to the packet parser 102 for parsing. The data requests from packet parser 102 may be for data from the payload or the header of received packets in data flow 104. The packet parser 102 defines instructions for the PH 103 based on the extracted data received from DP 101, and sends the instructions to the PH 103. The PH 103 performs various data processing operations based on the instructions from the packet parser 102. The packet parser 102 also determines what data is to be extracted next from the data stream 104 based on the current data that is extracted from data stream 104.

The extraction of data from data stream 104 by programmable multifield packet parser 102 is implemented as a FSM that manages a configurable packet pointer. In an FSM, the data inspection process is represented as a sequential of decisions, referred to as a state transition diagram. A state machine is used to step the state transition diagram, branching between states based on the data extracted from packets received in data flow 104. In each cycle, a transition rule in the state transition diagram of the FSM that matches the current state and one or more input symbols, which may include the current extracted data, is identified. Each transition rule also includes a next state value that indicates action to be taken in the event the transition rule is matched, i.e., selected as the current rule. The next state value may be used to determine which data fields the programmable multifield packet parser 102 requests for extraction by DP 101 from data stream 104 in the next clock cycle.

The state transition diagram of the FSM may be hardwired, which is power- and area-efficient, but does not provide flexibility to adapt to different applications and protocols. A programmable FSM (pFSM) implements the state transition diagram in a memory that may be updated to provide flexibility. However, a pFSM may be specialized for header processing; such a pFSM may not be re-used for the payload processing. In wire-speed parsing application, a pFSM-based packet parser may function at up to about 10 to 40 gigabits per second (Gbps), but the pFSM may stall above about 20 to 40 Gbps because packet processing is difficult to parallelize due to the sequential nature of packet data. The pFSM may therefore become complex and power/area hungry for a function that processes only the header portion of a packet. However, a balanced routing table search finite state machine (BFSM) is an example of a type of pFSM that offers good power and area efficiency without the drawbacks of some pFSM implementations. Therefore, the packet parser 102 may be implemented using a BFSM to manage the configurable packet pointer.

In a BFSM, the state transition diagram is described using transition rules, that each include match operators for the current state and input symbol values, and a next state value. In each cycle, a set of transition rules that match the current state and input symbols are identified using a hash function, and the highest priority transition rule of the set of identified transition rules is then selected as the current transition rule. The state transition diagram is organized such that the number of transition rules identified by the hash function is less than or equal to a maximum collision bound. BFSM technology may be high performance (1 transition per clock cycle in some embodiments) and is scalable, allowing large input vectors that may be required for multifield parsing, and may hold a large number of states and transitions (hundreds to thousands in various embodiments). BFSM performs efficient pattern matching at relatively moderated clock speed, limiting the overall power consumption. However, this does not preclude a BFSM to operate in the multi-gigahertz range because of the relative simplicity of its implementation. A BFSM is also more flexible than ad-hoc hardware-based packet parsing implementations; fast incremental updates of the states and transition rules may be supported, allowing new states and transitions to be added dynamically without the need for updating the entire state transition diagram. BFSM is also silicon efficient in term of area and storage efficiency. BFSM technology is discussed in further detail in U.S. Pat. No. 7,519,070 (Lunteren), U.S. Pat. No. 7,508,985 (Van Lunteren), and U.S. Patent Publication No. 2007/124,146 (Van Lunteren), each assigned to International Business Machines Corporation, and each herein incorporated by reference in their entirety.

The configurable packet pointer implemented in programmable multifield packet parser 102 may include a set of packet pointers in some embodiments, or a base packet pointer and a set of relative offsets in other embodiments. The configurable packet pointer may be configured in two parameters: the atomic parsing element size, and the maximum number of such atomic parsing elements that are extracted at a time. The atomic parsing element corresponds to a smallest indivisible unit of data that may be extracted from the data flow 104 by DP 101. The atomic parsing element may be any appropriate size, such as a digit, a byte, or a word, in various embodiments. Once the size and number of atomic parsing elements are configured (by, for example, an administrator of the computing system that includes the packet processing system 100), the configurable packet pointer is used by the packet parser 102 to index atomic parsing elements in the data stream 104 and request multiple variable length fields from data stream 104. The BFSM implemented in packet parser 102 manages advancement of the configurable packet pointer through the data stream 104. A configurable packet pointer may be configured to index any appropriate size of atomic parsing element, and to request any appropriate number of atomic parsing elements at a time for extraction.

Figure 2A:
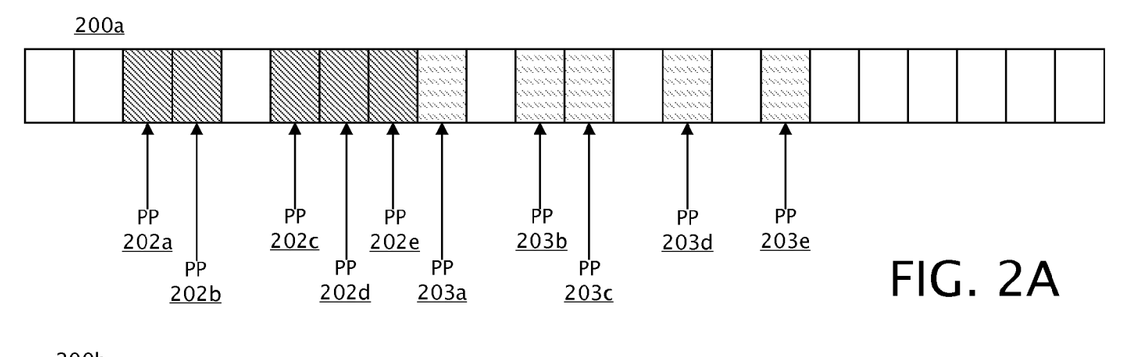
FIGS. 2A-B are schematic block diagrams illustrating embodiments of configurable packet pointers implemented by a programmable multifield packet parser.
Figure 2B:
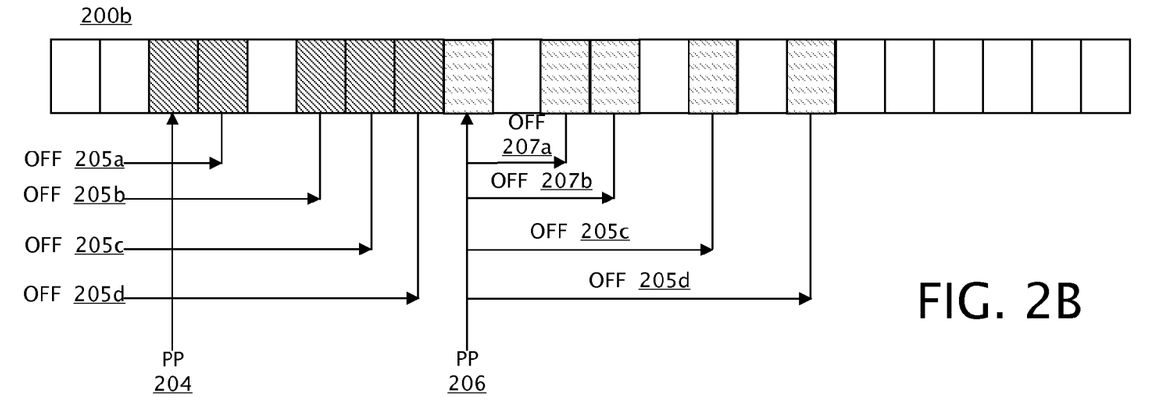

FIGS. 2A-B illustrate embodiments of configurable packet pointers that may be used by a programmable multifield packet parser 102 to extract data from exemplary data streams 200*a-b*. Data streams 200*a-b* are divided into atomic parsing elements of the size configured for the configurable packet pointer. In the embodiments shown in FIG. 2A-B, the number of atomic parsing elements extracted by the configurable packet pointer at a time is five; however, this is shown for exemplary purposes only. In FIG. 2A, data from data stream 200*a* is extracted by first configurable packet pointer including a first set of 5 packet pointers 202*a-e* in a first clock cycle, and then a second set of data is extracted by a second configurable packet pointer including a second set of 5 packet pointers 203*a-e* in a second clock cycle. Each of packet pointers 202*a-e* and 203*a-e* extract one atomic parsing element of data from data stream 200*a*. Each of packet pointers 202*a-e* and 203*a-e* may be set to any available index in a data stream such as data stream 200*a*. A set of packet pointers may index non-contiguous data in the data stream; for example, packet pointers 202*b* and 202*c* have an atomic parsing element between them that is not indexed. In FIG. 2B, 5 atomic parsing elements are extracted at a time from data stream 200*b* by a configurable packet pointer including a first base packet pointer 204 and a first set of 4 relative offsets 205*a-d* in a first clock cycle, and then by a second configurable packet pointer including a second base packet pointer 206 and second set of 4 relative offsets 207*a-d* in a second clock cycle. While offsets 205*a-d* and 207*a-d* are all shown as positive with respect to respective base packet pointers 204 and 206, an offset may be either positive or negative in relation to its corresponding base packet pointer in various embodiments, and may be set to any available index in a data stream such as data stream 200*b*. A base packet pointer and offsets may index contiguous or non-contiguous data in the data stream; for example, offsets 205*a* and 205*b* have an atomic parsing element between them that is not indexed. Non-contiguous indexed data may have any appropriate offset between the non-contiguous indexed data.

The atomic parsing elements may be any appropriate size, including but not limited to a digit, a byte, bit, or a word in various embodiments. For example, for a packet processing system 100 that receives and processes Ethernet data, the size of the atomic parsing element may be set to 8 bits (also referred to as a byte). Once the atomic parsing element size is determined, the maximum number of atomic elements to be extracted at a time is determined. This number typically depends upon the protocol and application of the computing system, the size of the atomic parsing element, and the performance of the hardware comprising packet parser 102. Three bytes at a time may be sufficient to parse a 10 Gbs protocol stack combination that can be found over Ethernet for protocols such as ISL, DIX, SAP/SNAP, VLAN, MPLS, PPPoE, IPv4, IPv6, TCP, or UDP. Therefore, 3 bytes may be extracted and analyzed at a time by a configurable packet pointer for an Ethernet packet processing system. However, extracting a higher number of bytes each clock cycle, by increasing the atomic parsing element size and/or the number of atomic parsing elements, has the potential to inspect higher link rates (such as 40 Gbs or 100 Gbs) by enabling inter-layer parsing.

Figure 3:
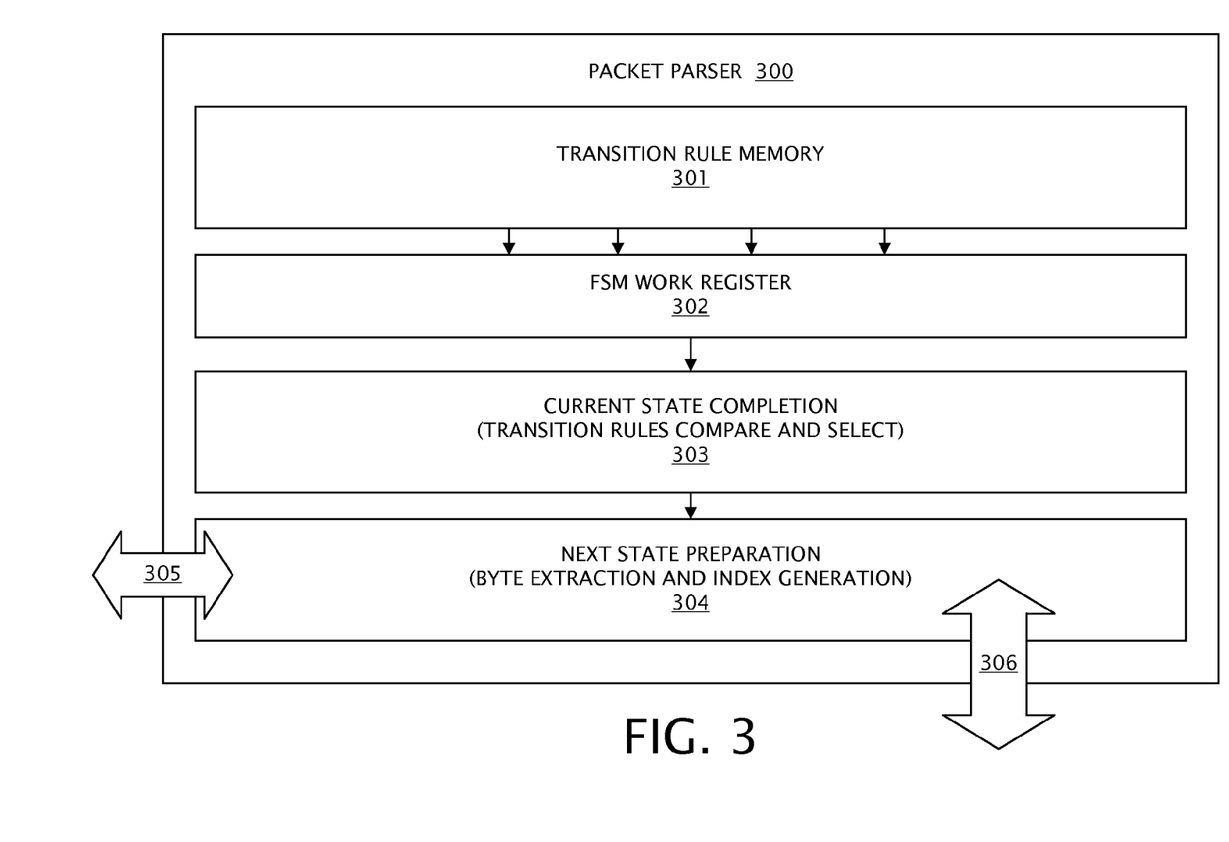
FIG. 3 is a schematic block diagram illustrating an embodiment of a programmable multifield packet parser.

The configurable packet pointers as shown in FIGS. 2A-B are controlled by a FSM, and preferably by a BFSM. FIG. 3 illustrates a block diagram of a programmable multifield packet parser 300 that implements a BFSM to manage a configurable packet pointer such as is discussed with respect to FIGS. 2A-B. Packet parser 102 of FIG. 1 may implement packet parser 300, and FIG. 3 is discussed with respect to FIG. 1. Packet parser 300 includes a transition rule memory (TRM) 301 that holds the BFSM state transition diagram including the transition rules. The transition rules include the current state and input symbols to be matched, as well as the next state actions to be performed upon finding a successful match. The BFSM is based on a hash function that limits the maximum number of collisions (i.e., rule matches) for any hash index to a configurable maximum collision bound; the maximum collision bound may determine the number of rules contained in a row in the TRM 301. A FSM work register (FWR) 302 holds the state information required to operate the BFSM. A current state completion (CSC) module 303 selects the current transition rule from the rules in TRM 301 based on the current state and input symbols including the current extracted data. A next state preparation (NSP) module 304 generates requests for the next data in data stream 104 based on the current transition rule (which then becomes the current extracted data after the next state transition of the BFSM), and prepares the conditions for selecting the next current transition rule by CSC 303 by updating the FWR 302. The execution of a state transition by the packet parser 300 includes three phases: read access of TRM 301 to load a row of transition rules into FWR 302 based on the hash function; selecting a current transition rule by the CSC module 303 from the row of rules in FWR 302 based on the current state and input symbols including the current extracted data; and requesting next data extraction and updating of the FWR 302 by the NSP module 304, including the generation of the hash function that indicates the address of the next row of rules to be loaded from the TRM 301 to the FWR 302 in the next cycle.

The TRM 301 is a memory containing the transition rules of the BFSM implemented in programmable packet parser 300. The transition rules include the current state and input symbols to be matched, as well as the next state actions to be performed upon finding a successful match. The TRM 301 is configurable by an administrator of the packet processing system 100 that includes packet parser 300, and the transition rules may be changed or updated as needed to handle different protocols or applications. The maximum collision bound of the BFSM hash function may determine a number of rules contained in a row of the TRM 301. Each rule in the TRM 301 includes a test part and a result part. The test part contains the portion of the rule to be matched by the CSC module 303 to select the current transition rule, and may include a current state value, and various comparison and mask values. The result part indicates the next state value for the transition rule, and is used to determine the indices of the atomic parsing elements to be requested in the next round of data extraction by NSP module 304. The result part may also be used by the NSP module 304 to initiate packet handling actions by PH 103 of FIG. 2.

Figure 6:
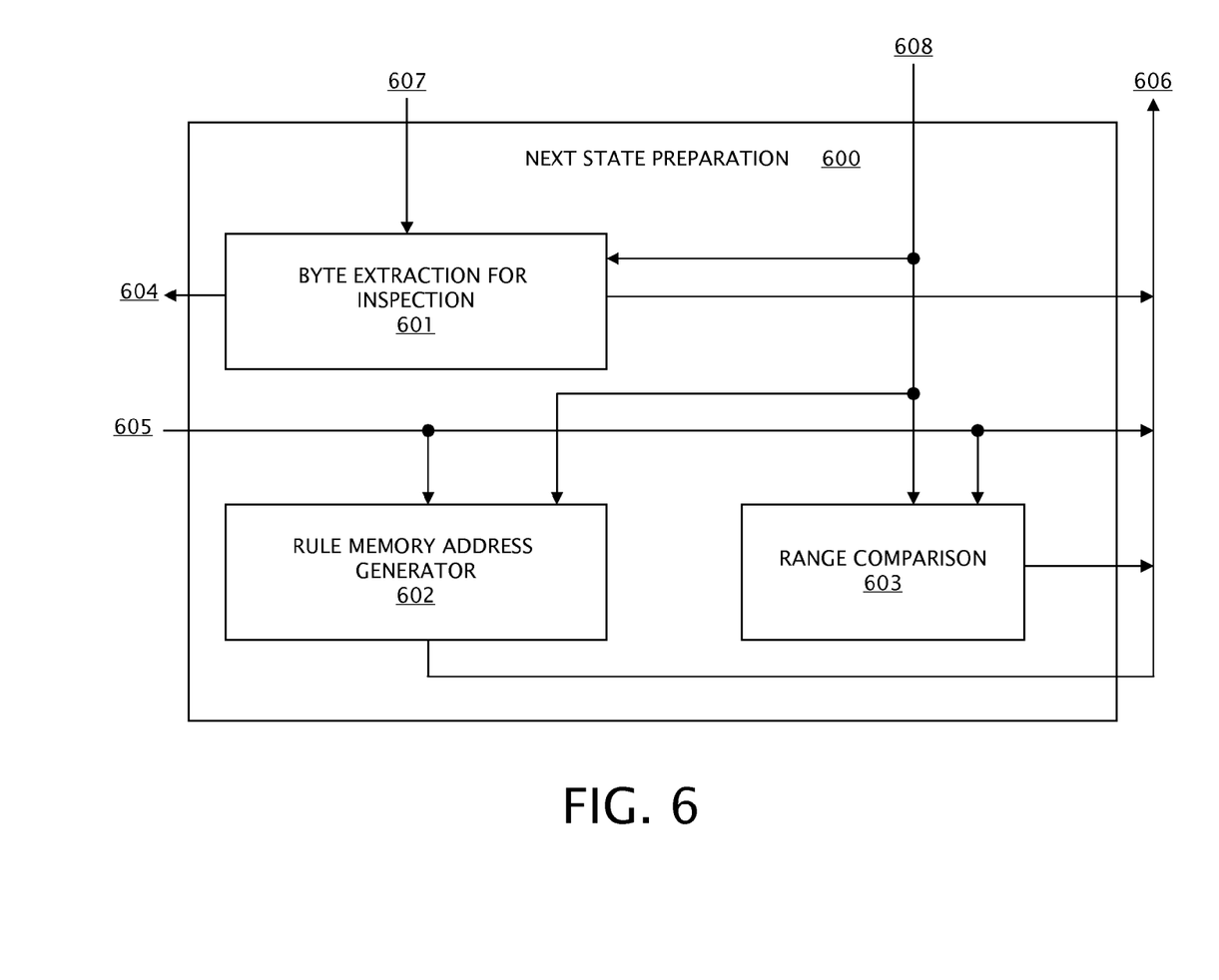
FIG. 6 is a schematic block diagram illustrating an embodiment of a next state preparation module.

The test part of a transition rule in TRM 301 may include the following fields: state, source symbol selection (SSS), range comparison mask (RCM), compare value (CV) and compare mask (CM). The state field is the state to be matched for the rule to apply. The source symbol selection fields provide a means to select the source of the input symbols to be matched. The input symbols to be matched are typically extracted from the data flow 104. However, there are cases where a match is to be made based upon additional information such as (for example) the contents of a register file, a scratch pad memory that was previously set during the current packet processing, a particular signature word or marker field, or hardware information that is not embedded into the packet data (e.g., the origin or the configuration of a port). The symbol selection may be made on-the-fly per every rule and per-atomic parsing element based on the source symbol selection fields. The RCM extends the comparisons that may be performed using the rules in the TRM 301. A pattern matching system such as BFSM performs exact-, prefix- and ternary-match searches; however, arithmetic comparisons such as greater-than-or-equal-to and less-than-or-equal-to may not be available. The range comparison mechanism used in parallel with a pattern matching system allows such arithmetic comparisons. The RCM bit enables or disables the usage of range comparison module 603 in the NSP module (304, 600). A compare value includes the binary test value of the input symbols to be matched for this rule to apply. There may be one compare value per input symbol. A compare mask is used in combination of the compare value to build a ternary match condition for this rule. The ternary match condition will match if the bits of the current state and input symbols equal the bits at the bit positions corresponding to the set bits in the compare mask. The remaining bit positions are don't care. For example, the ternary match condition "0x08.00." of a state-transition rule might be stored as a compare value "0x80.00.00" and a compare mask "0xFF.FF.00" in the corresponding transition rule entry. The above test part fields are given for illustrative purposes only; a transition rule in TRM 301** may be implemented in any appropriate manner.

The result part of a transition rule in TRM 301 may include the following fields: next state, next state mask, next input symbol bits selection, instruction set for packet inspection, range code comparison, instruction set for packet handling, and markers. The next state value indicates the state destination of the state machine branch upon the matching of a given rule. The size of the next state field may equal the size of the state field. The next state mask is applied by the rule memory address generator 602 in NSP (304, 600) to compute the hash function that indicates the next transition rule index. The next input symbol bits selection includes the bit positions within the input symbols to apply by the rule memory address generator 602 in NSP (304, 600) to compute the hash function that indicates the next transition rule index. The instruction set for packet inspection includes a specialized instruction set for advancing the configurable packet pointer and managing the relative packet pointer offsets. The range comparison code (RCC) is a code to select a specific comparison range from a table in RC module 603 in NSP (304, 600), or a single threshold from the rule. The instruction set for packet handling indicates one or more actions to be applied by PH 103 to the extracted bytes for parsing in the event the transition rule is selected as the current transition rule. The marker includes a code to set a specific marker, where multiple markers can be seen as a kind of signature word summarizing the protocol stack of each packet. These result part fields are given for illustrative purposes only; a transition rule in TRM 301 may be implemented in any appropriate manner.

Figure 4:
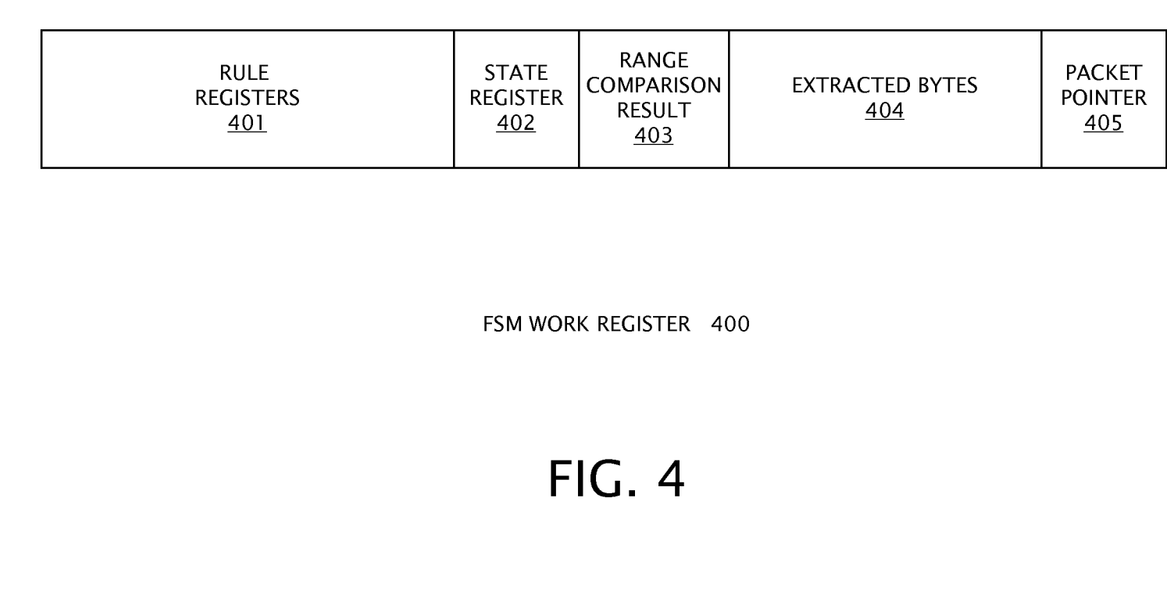
FIG. 4 is a schematic block diagram illustrating an embodiment of a finite state machine work register.

The FWR (302, 400) is shown in more detail in FIG. 4. FWR 400 includes a set of registers 401-405 to maintain the state information required to operate the BFSM implemented in packet parser 300. Rule registers 401 stores a row of rules read from TRM 301 based on the hash function determined by NSP 304. The number of registers in rule registers 401 is the same as a number of rules in a row in the TRM 301. The state register 402 stores the current state of the BFSM. State register 402 is updated by the CSC module 303 with the next state field of the current transition rule when a current transition rule is selected. The range comparison result (RCR) register 403 stores a range comparison result from RC module 603 in NSP module 304. Extracted byte registers 404 hold the current data extracted from the data stream 104 by the configurable packet pointer; the extracted byte registers 404 are updated by NSP module 304 when new data is extracted. Packet pointer register 405 stores the location of the configurable packet pointer in the data stream 104; as the configurable packet pointer is advanced through the data stream 104 by the NSP module 304, the packet pointer registers 405 are updated. Registers 401-405 are shown for illustrative purposes only; a FWR 400 may contain any appropriate number and configuration of registers, and the registers may be of any appropriate size, as required by the BFSM implemented in packet parser 300.

Figure 5:
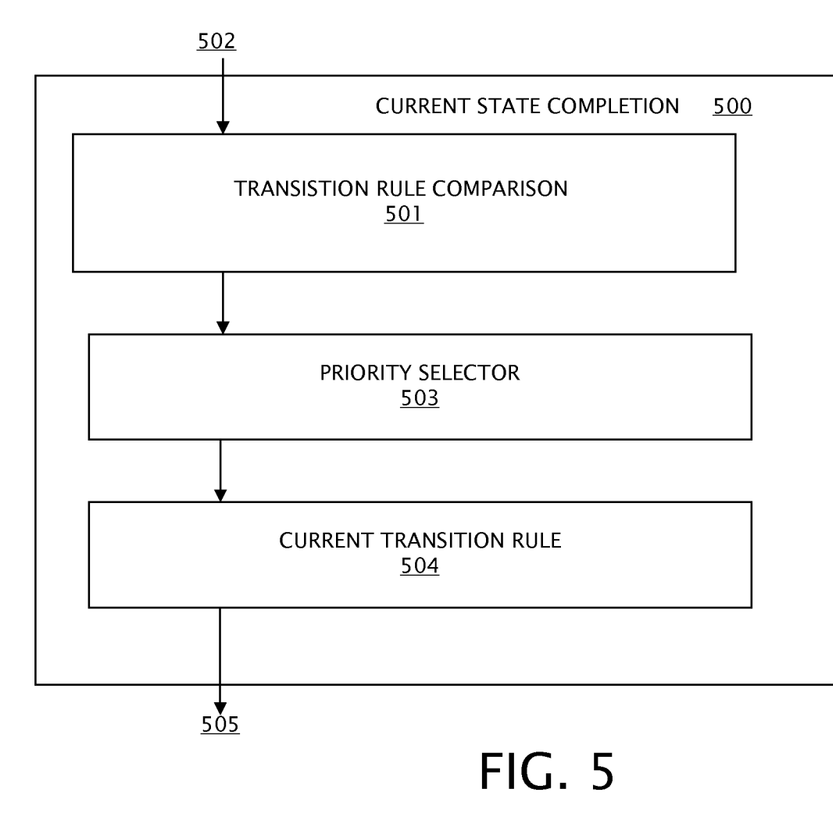
FIG. 5 is a schematic block diagram illustrating an embodiment of a current state completion module.

The CSC module (303, 500) is shown in FIG. 5. CSC 500 module selects the current transition rule from the row transition rules that were loaded into rule registers 401 of the FWR (302, 400) from TRM 301. CSC 500 implements a BFSM rule selector including a transition rule comparison module 501, which includes a set of transition rule comparators operated in parallel. The number of transition rule comparators in transition rule comparison module 501 is the same as the number of rules in rule registers 401. The transition rule comparison module 501 receives the transition rules stored in transition rule register 401 of FWR (302,400) through input 502, and compares the test parts of the received transition rules with any appropriate test fields, including but not limited to the values stored in any of state register 402, RCR register 403, and a combination of extracted byte registers 404 and non-data packet symbols. The combination of extracted byte registers 404 and non-data packet symbols is made on-the-fly per every rule and per-atomic parsing element based on the source symbol selection fields. Priority selector 503 then selects the highest-priority matching transition rule based on the results of the transition rule comparison module 501 as the current transition rule. The current transition rule is stored in the current transition rule (CTR) module 504. The next state field of the current transition rule in CTR module 504 is used to update state register 402 of the FWR (302, 400) via CTR output 505.

The NSP module (304, 600) requests data to be extracted from the data stream 104 and prepares the conditions for selecting the next active rule, based on inputs (not shown) from the CTR module 504 and FWR (302, 400). A block diagram of a next state preparation (NSP) unit 600 is shown in FIG. 6. NSP module 600 requests data to be extracted from data stream 104 by sending data requests to DP 101 via 604, and updates the extracted byte registers 404 of FWR (302, 400) with new extracted data received via 605. The NSP module also handles advancement of the packet pointer by updating packet pointer register 405 via output 606, which is connected to FWR (302,400). Input 607 receives data from the FWR (302, 400), and input 608 receives data from the output 505 of CSC (303, 500). The NSP module 600 includes 3 sub-modules: byte extraction and inspection (BEI) module 601, range comparison (RC) module 603, and rule memory address generator (RMAG) module 602. The NSP module 600 may include other registers or modules needed to implement the BFSM, such as a register file or a signature register (not shown), in various embodiments.

BEI module 601 increments the packet pointer location that is stored in packet pointer register 405 based on the current transition rule stored in CTR module 504, sends data extraction requests for specific indices in data stream 104 to the DP 101 through extraction request output 604 based on the incremented packet pointer, and then updates the packet pointer register 405 with the incremented packet pointer. BEI module 601 may manage the configurable packet pointer as a set of packet pointers (such as described with respect to FIG. 2A), or as a base packet pointer and a set of offsets (such as described in FIG. 2B) in various embodiments. The extracted data is received from DP 101 on extracted data input 605, and is routed to the RC module 603 and RMAG module 602, as well as to the extracted byte registers 404 of FWR (303, 400) via output 606.

The RMAG module 602 computes the hash function that gives the next transition rule row index based on the extracted data input 605 and the result part of the current transition rule stored in CTR module 504. The index computed by the RMAG module 602 determines the next row of rules that is read into rule registers 401 from TRM 301. The BART algorithm is based on a hash function for longest-matching prefix searches. The hash index includes a subset of the search key bits selected such that for each hash index at most one prefix exists that can be the longest matching prefix of the search key. The hash index is extracted from bit positions within a search key vector, which are selected to realize the maximum collision bound. The value of the maximum collision bound is based on the memory access granularity to ensure that all collisions for a given hash index can be resolved by a single memory access and by at most a number of parallel comparisons that is less than or equal to the maximum collision bound. This reduces the number of rules that need to be compared by transition rule comparison module 501 in CSC module (303, 500) to the maximum collision bound. The hash function may be computed based on any combination of bits from the extracted atomic parsing elements, a register file, a signature register and a hardware configuration in various embodiments.

The combination of bits from the extracted atomic parsing elements, the register file, the signature register and the hardware configuration, constitute the search key of the RMAG module 602. The rule row index is computed from bits from the BFSM next-state and next state mask, and from bits from the search key according to the following preferred hash function:

$$\text{RuleRowIndex} = ((\text{NextState} \wedge !\text{NextStateMask}) \vee (\text{SearchKey} \wedge \text{NextStateMask}))$$

The range comparison (RC) module 603 includes a table that defines a set of ranges based on pre-assigned minimum and maximum values. A pattern matching system such as BFSM performs exact-, prefix- and ternary-match searches by comparing the 3-tuple {State, Compare Value, Compare Mask} of the rule with the state register 402 and the input symbol values 605 extracted from the packet. However, arithmetic comparisons such as greater-than-or-equal-to and less-than-or-equal-to may not be available. The RC module 603 allows such arithmetic comparisons using the extracted data input 605. The transition rules in TRM 301 define a range comparison using an RCM field in the test portion and a RCC field in the result portion of the rule; the RCM indicates whether or not a range comparison needs to be performed, and the RCC designates a range in the table of the RC module 603. If the RCM of the current transition rule indicates that a range comparison is needed, the data extracted from data stream 104 by BEI 601 is compared to the range defined by the RCC of the current transition rule stored in CTR module 504. The RC module 603 compares a value of extracted packet data 605 with either a set of pre-assigned ranges defined by a 4-tuple {Max, Min, Mask, Align} or a 3-tuple {Threshold, Mask, Align} contained in the current transition rule. The result of the range comparison performed by RC module 603 is stored in the RCR register 403 of the FWR (304, 400) via output 606, and is used by CSC (303, 500) to complement the BFSM pattern matching result and determine current transition rules.

Figure 7:
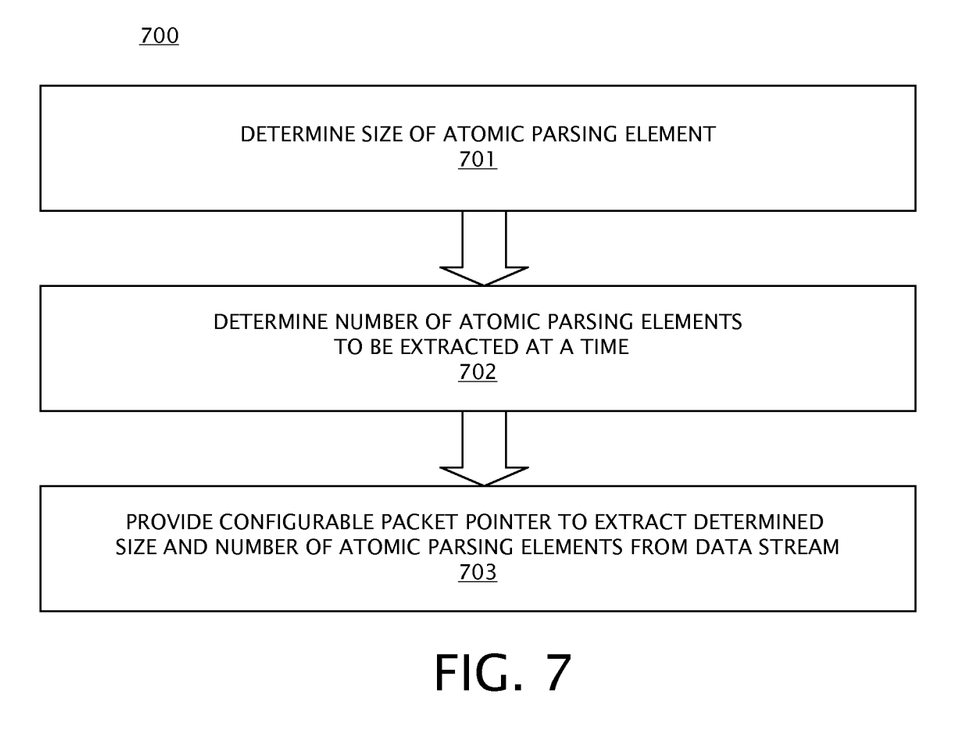
FIG. 7 is a schematic block diagram illustrating an embodiment of a method of operating a programmable multifield packet parser.

FIG. 7 illustrates a flow diagram of a method 700 of operating a programmable packet parser. In block 701, the size of an atomic parsing element is configured. The size may be selected based on an application or protocol for which the computing system that includes the packet parser is used. In block 702, a number of atomic parsing elements to be extracted at a time by the programmable multifield packet parser is configured. The number may be based on the size of the atomic parsing element, the processing power of the hardware comprising the packet parser, and an application or protocol for which the computing system that includes the packet parser is used. In block 703, the configured packet pointer is provided to index and request extraction of the determined number of atomic parsing elements of the determined size at a time from a data stream being parsed by the packet parser. Advancement of the configured packet pointer in the data stream is managed by an FSM, and preferably by a BFSM.

Figure 8:
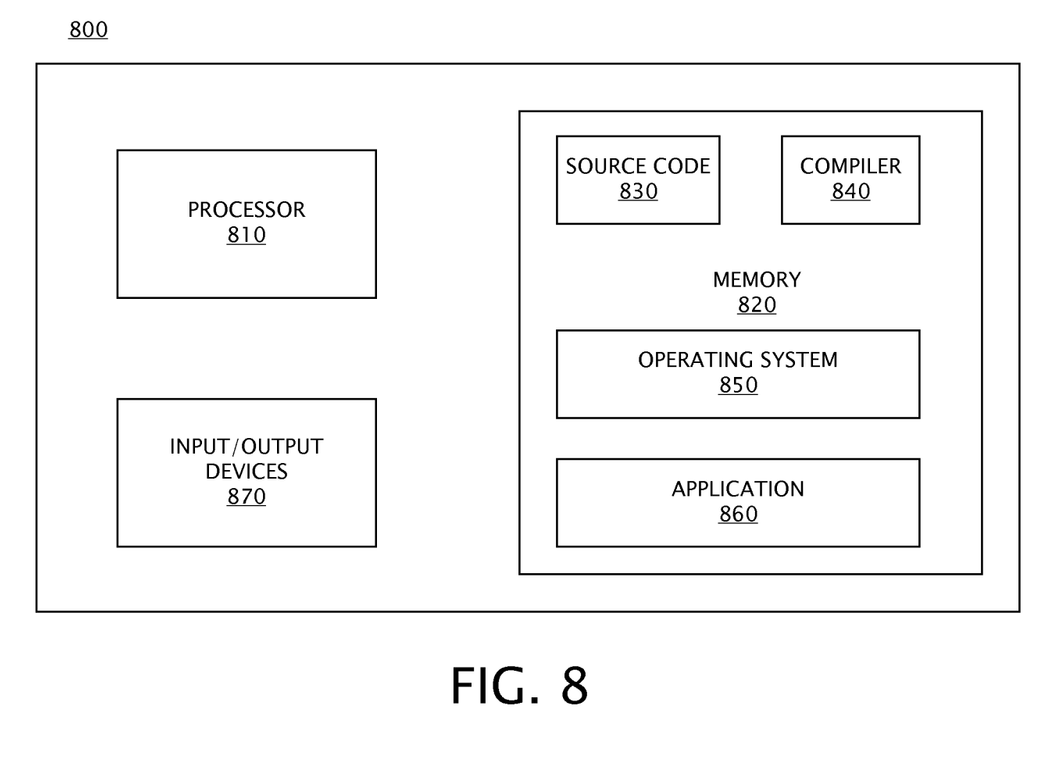
FIG. 8 is a schematic block diagram illustrating an embodiment of a computer that may be used in conjunction with a programmable multifield packet parser.

FIG. 8 illustrates an example of a computer 800 which may be implement exemplary embodiments of a programmable packet parser. Various operations discussed above may utilize the capabilities of the computer 800. One or more of the capabilities of the computer 800 may be incorporated in any element, module, application, and/or component discussed herein, and a packet processing system 100 including a programmable packet parser 103 may be included in, for example, input/output devices 870.

The computer 800 includes, but is not limited to, PCs, workstations, laptops, PDAs, palm devices, servers, storages, and the like. Generally, in terms of hardware architecture, the computer 800 may include one or more processors 810, memory 820, and one or more input and/or output (I/O)

devices 870 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 810 is a hardware device for executing software that can be stored in the memory 820. The processor 810 can be virtually any custom made or commercially available processor, a central processing unit (CPU), a digital signal processor (DSP), or an auxiliary processor among several processors associated with the computer 800, and the processor 810 may be a semiconductor based microprocessor (in the form of a microchip) or a macroprocessor.

The memory 820 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 820 may incorporate electronic, magnetic, optical, and/or other types of storage media. Note that the memory 820 can have a distributed architecture, where various components are situated remote from one another, but can be accessed by the processor 810.

The software in the memory 820 may include one or more separate programs, each of which comprises an ordered listing of executable instructions for implementing logical functions. The software in the memory 820 includes a suitable operating system (O/S) 850, compiler 840, source code 830, and one or more applications 860 in accordance with exemplary embodiments. As illustrated, the application 860 comprises numerous functional components for implementing the features and operations of the exemplary embodiments. The application 860 of the computer 800 may represent various applications, computational units, logic, functional units, processes, operations, virtual entities, and/or modules in accordance with exemplary embodiments, but the application 860 is not meant to be a limitation.

The operating system 850 controls the execution of other computer programs, and provides scheduling, input-output control, file and data management, memory management, and communication control and related services. It is contemplated by the inventors that the application 860 for implementing exemplary embodiments may be applicable on all commercially available operating systems.

Application 860 may be a source program, executable program (object code), script, or any other entity comprising a set of instructions to be performed. When a source program, then the program is usually translated via a compiler (such as the compiler 840), assembler, interpreter, or the like, which may or may not be included within the memory 820, so as to operate properly in connection with the O/S 850. Furthermore, the application 860 can be written as an object oriented programming language, which has classes of data and methods, or a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices 870 may include input devices such as, for example but not limited to, a mouse, keyboard, scanner, microphone, camera, etc. Furthermore, the I/O devices 870 may also include output devices, for example but not limited to a printer, display, etc. Finally, the I/O devices 870 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 870 also include components for communicating over various networks, such as the Internet or intranet.

If the computer 800 is a PC, workstation, intelligent device or the like, the software in the memory 820 may further include a basic input output system (BIOS) (omitted for simplicity). The BIOS is a set of essential software routines that initialize and test hardware at startup, start the O/S 850, and support the transfer of data among the hardware devices. The BIOS is stored in some type of read-only-memory, such as ROM, PROM, EPROM, EEPROM or the like, so that the BIOS can be executed when the computer 800 is activated.

When the computer 800 is in operation, the processor 810 is configured to execute software stored within the memory 820, to communicate data to and from the memory 820, and to generally control operations of the computer 800 pursuant to the software. The application 860 and the O/S 850 are read, in whole or in part, by the processor 810, perhaps buffered within the processor 810, and then executed.

When the application 860 is implemented in software it should be noted that the application 860 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 860 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

More specific examples (a nonexhaustive list) of the computer-readable medium may include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 860 is implemented in hardware, the application 860 can be implemented with any one or a combination of the following technologies, which are well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The technical effects and benefits of exemplary embodiments include a programmable packet parser that allows dynamic updates and operates at a relatively high speed.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method of operating a packet parser in a computing system, comprising:
    receiving a data stream by the computing system;
    providing a configurable packet pointer by the packet parser, the packet pointer configured to index and extract a configurable number of atomic parsing elements in the data stream, wherein the extracted atomic parsing elements are non-contiguous in the data stream and have a configurable size;
    receiving the extracted atomic parsing elements from the data stream by the packet parser; and
    advancing the configurable packet pointer through the data stream based on a set of transition rules of a finite state machine (FSM) that are stored in a transition rule memory (TRM), the advancing of the configurable packet pointer comprising:
        selecting, by a current state completion (CSC) module, a current transition rule from the set of transition rules in the TRM based on the received extracted atomic parsing elements; and
        advancing, by a next state preparation (NSP) module, the configurable packet pointer based on the current transition rule selected by the CSC module; and
        receiving, by the next state preparation (NSP) module, a next set of extracted atomic parsing elements from the data stream based on the current transition rule selected by the CSC module.

2. The method of claim 1, wherein the size of the atomic parsing elements is configured based on a protocol of the data stream.

3. The method of claim 2, wherein the number of atomic parsing elements is configured based on at least one of the size of the atomic parsing elements, the protocol of the data stream, and a speed of the packet parser.

4. The method of claim 1, wherein the configurable packet pointer comprises a set of packet pointers, each of the set of packet pointers indexing an atomic parsing element in the data stream, and wherein the number of packet pointers in the set of packet pointers is less than or equal to the configurable number of atomic parsing elements.

5. The method of claim 1, wherein the configurable packet pointer comprises a base packet pointer and a set of offsets relative to the base packet pointer, each of the base packet pointer and set of offsets indexing an atomic parsing element in the data stream, and wherein the number of offsets in the set of offsets is less than or equal to the configurable number of atomic parsing elements minus 1.

6. The method of claim 5, wherein at least one offset of the set of offsets corresponds to an index in the data stream that has a negative position with respect to the base packet pointer.

7. The method of claim 5, wherein at least one offset of the set of offsets corresponds to an index in the data stream that has a positive position with respect to the base packet pointer.

8. The method of claim 1, wherein the FSM comprises a balanced routing table search FSM (BFSM).

9. A packet parser for a computing system, the packet parser configured to:
    provide a configurable packet pointer, the packet pointer configured to index and extract a configurable number of atomic parsing elements in a data stream received by the computing system, wherein the extracted atomic parsing elements have a configurable size and are non-contiguous in the data stream, the packet parser further configured to receive the extracted atomic parsing elements from the data stream, wherein the configurable packet pointer is advanced through the data stream based on a set of transition rules of a finite state machine (FSM), the packet parser further comprising:
    a transition rule memory (TRM) comprising the set of transition rules;
    a current state completion (CSC) module configured to select a current transition rule from the set of transition rules in the TRM based on the received extracted atomic parsing elements; and
    a next state preparation (NSP) module configured to advance the configurable packet pointer and receive a next set of extracted atomic parsing elements from the data stream based on the current transition rule selected by the CSC module.

10. The packet parser of claim 9, wherein the FSM comprises a balanced routing table search FSM (BFSM).

11. The packet parser of claim 9, wherein the CSC module is further configured to select the current transition rule based on a current state, a range comparison result and one or more input symbols, the input symbols including at least one of: extracted atomic parsing elements from the data stream and non-data stream data from the packet parser, the non-data stream data from the packet parser including the content of a register file, a scratch pad memory that was previously set during the current packet processing, a particular signature word or marker field, and any hardware information that is not embedded in the data stream.

12. The packet parser of claim 9, wherein the next-state preparation (NSP) module comprises a byte extraction for inspection (BEI) module configured to increment the configurable packet pointer and send data extraction requests based on the configurable packet pointer to a data path of the computing system.

13. The packet parser of claim 9, wherein the next-state preparation (NSP) module comprises a range comparison (RC) module configured to compare a value of an extracted atomic parsing element with one of a set of pre-assigned ranges defined by a 4-tuple defined as {Max, Min, Mask, Align}, or a 3-tuple defined as {Threshold, Mask, Align}, contained in the current transition rule, and to generate a range comparison result based on the comparison.

14. The packet parser of claim 9, wherein the next-state preparation (NSP) module comprises a rule memory address generator (RMAG) module configured to determine a hash function that indicates a row of transition rules in the TRM that contains the next transition rule, wherein the CSC module selects the current transition rule from the row of transition rules determined by the RMAG module.

15. The packet parser of claim 14, wherein the RMAG module is configured to determine the hash function using a combination of bits from the received extracted atomic parsing elements, a register file, a signature register and a hardware configuration.

16. The packet parser of claim 9, wherein the configurable packet pointer comprises a set of packet pointers, each of the set of packet pointers indexing an atomic parsing element in the data stream, and wherein the number of packet pointers in the set of packet pointers is less than or equal to the configurable number of atomic parsing elements.

17. The packet parser of claim 9, wherein the configurable packet pointer comprises a base packet pointer and a set of offsets relative to the base packet pointer, each of the base packet pointer and set of offsets indexing an atomic parsing element in the data stream, and wherein the number of offsets in the set of offsets is less than or equal to the configurable number of atomic parsing elements minus 1.

18. A computer program product for operating a packet parser in a computing system, the computer program product comprising a non-transitory computer readable medium having computer-readable program code embodied therewith, which when executed by a computer processor, causes the computer processor to implement:
  receiving a data stream by the computing system;
  providing a configurable packet pointer by the packet parser, the packet pointer configured to index and extract a configurable number of atomic parsing elements in the data stream, wherein the extracted atomic parsing elements are non-contiguous in the data stream and have a configurable size;
  receiving the extracted atomic parsing elements from the data stream by the packet parser; and
  advancing the configurable packet pointer through the data stream based on a set of transition rules of a finite state machine (FSM) that are stored in a transition rule memory (TRM), the advancing of the configurable packet pointer comprising:
    selecting, by a current state completion (CSC) module, a current transition rule from the set of transition rules in the TRM based on the received extracted atomic parsing elements; and
    advancing, by a next state preparation (NSP) module, the configurable packet pointer based on the current transition rule selected by the CSC module; and
    receiving, by the next state preparation (NSP) module, a next set of extracted atomic parsing elements from the data stream based on the current transition rule selected by the CSC module.

\* \* \* \* \*